United States Patent
Chai

(10) Patent No.: US 6,885,524 B2
(45) Date of Patent: Apr. 26, 2005

(54) AUDIO/CONTROL HEAD ASSEMBLY OF MAGNETIC RECORDING AND REPRODUCING DEVICE

(75) Inventor: Yu-Seok Chai, Suwon (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 10/244,731

(22) Filed: Sep. 17, 2002

(65) Prior Publication Data

US 2003/0053263 A1 Mar. 20, 2003

(30) Foreign Application Priority Data

Sep. 18, 2001 (KR) .......................................... 2001-57666

(51) Int. Cl.[7] .............................. G11B 5/48; G11B 5/56
(52) U.S. Cl. ................................................... 360/291.3
(58) Field of Search ................................ 360/290, 291, 360/291.1, 291.2, 291.3

(56) References Cited

U.S. PATENT DOCUMENTS

| | | | | | |
|---|---|---|---|---|---|
| 4,086,638 A | * | 4/1978 | Saito | ........................ | 360/291.3 |
| 4,319,293 A | * | 3/1982 | Tomabechi | ................. | 360/251 |
| 4,550,352 A | * | 10/1985 | Nakao | ...................... | 360/291.3 |
| 4,638,392 A | * | 1/1987 | Akutsu | .................... | 360/130.32 |
| 4,875,123 A | * | 10/1989 | Kang | ....................... | 360/291.3 |
| 5,703,737 A | * | 12/1997 | Katohno et al. | ......... | 360/291.3 |
| 5,880,909 A | * | 3/1999 | Jeong et al. | ............. | 360/291.3 |
| 6,661,608 B2 | * | 12/2003 | Matsui et al. | ............... | 360/129 |
| 2002/0024773 A1 | * | 2/2002 | Matsui et al. | ............ | 360/291.3 |

FOREIGN PATENT DOCUMENTS

| | | | | |
|---|---|---|---|---|
| JP | 3-280209 A | * | 12/1991 | |
| JP | 10-64030 A | * | 3/1998 | |
| JP | 2000-155919 A | * | 6/2000 | |

* cited by examiner

*Primary Examiner*—Jefferson Evans
(74) *Attorney, Agent, or Firm*—Birch, Stewart, Kolasch & Birch, LLP

(57) ABSTRACT

An audio/control head assembly of a magnetic recording and reproducing device includes: a head base on which an audio/control head is mounted; a plurality of engaging parts formed at a main chassis, with which a plurality of adjustment bolts are engaged after passing the head base so that the head base can be engaged to be adjustable in its position; and a spring installed between the head base and the main chassis to elastically support the head base. Since the head base with the audio/control head mounted thereon is position-adjustably engaged at the main chassis directly, a unit for adjusting the position of the audio/control head is not necessary. Thus, the number of parts can be reduced, and accordingly, the fabrication cost can be reduced. In addition, since the number of the assembly parts is reduced, an assembly process can be reduced, an assembly workability can be improved, and an assembly time can be shortened.

9 Claims, 9 Drawing Sheets

AUDIO/CONTROL HEAD ASSEMBLY OF MAGNETIC RECORDING AND REPRODUCING DEVICE

This nonprovisional application claims priority under 35 U.S.C. § 119(a) on Patent Application No. 57666/2001 filed in Korea on Sep. 18, 2001, which is herein incorporated by reference.

BACKGROUND OF THE INVENTION

1. Field of the Invention

The present invention relates to a magnetic recording and reproducing device, and more particularly, to an audio/control head assembly of a magnetic recording and reproducing device with an improved structure that an audio/control head is mounted at a main chassis.

2. Description of the Background Art

FIG. 1 shows the construction of a magnetic recording and reproducing device in accordance with a conventional art.

As shown in FIG. 1, the conventional magnetic recording and reproducing device includes: a main chassis 102; reel driving mechanism 110 and 112 installed in the main chassis 102 and driving a feeding reel 106 and a winding reel 108 of a tape cassette 104; a head drum 116 for reproducing a signal recorded at the tape 114 or recording a signal on the tape 114; an audio/control head 118 for deleting, recording and reproducing an audio signal, and recording and reproducing a control signal; and a plurality of posts and a guide roller for guiding a traveling of the tape 114 released from the tape cassette 104.

A tensile force of the tape 114 released from the feeding reel 106 of the tape cassette 104 is controlled by a tension post 120, and after the tape 114 passes the tension post 120, it is guided by a guide post 122 and transmitted to a erasing head 124. The erasing head 124 erases a signal recorded on the tape 114 in a recording mode.

After passing the erasing head 124, the tape 114 is guided to the head drum 116 by feeding and winding guide posts 126 and 128 and feeding and winding slant posts 130 and 132 respectively installed at both sides of the head drum 116. The head drum 116 reproduces a signal recorded on the tape 115 or records a signal on the tape 115.

After passing the winding slant post 132 and the guide post 128 via the head drum 116, the tape 115 passes the audio/control head 118. The audio/control head 118 deletes, records reproduces an audio signal, and record and reproduces a control signal.

After passing the audio/control head 118, the tape 114 passes a guide post 134, during which its travel height is controlled, and a capstan shaft 136 is installed at a position after the guide post 134, to provide a traveling force to the tape 114.

The capstan shaft 136 is an output shaft of a capstan motor (not shown) installed at the opposite side of the main chassis 102, and according to the rotation direction of the capstan motor, the traveling direction of the tape is determined.

A pinch roller 138 is provided at one side of the capstan shaft 136, being selectively attached to the capstan shaft 136, to provide a force for pulling the tape 114.

After passing the capstan shaft 136, the tape 114 is guided by a winding post 140 and wound on the winding reel 108.

The structure that the audio/control head is mounted in the main chassis of the magnetic recording and reproducing device as described above will now be explained.

Referring to an engaging structure of the audio/control head in FIGS. 2, 3 and 4, the audio/control head 118 is mounted at one side of the head base 150, the head base 150 is engaged with a mounting bracket 154 so that its height can be controlled by adjustment bolts 152a, 152b and 152c, and the mounting bracket 154 is fixed at the main chassis 102 by a fixing bolt 156.

As shown in FIGS. 2 and 5, the head base 150 is formed as a flat type roughly making a triangle shape, the audio/control head 118 is fixed at one side thereof, and through holes 158a, 158b and 158c are formed at the three corner portions, through which the adjustment bolts 152a, 152b and 152c penetrate.

The two through holes 158b and 158c are formed in a slot shape, and one through hole 158a is formed in a circular shape.

As shown in FIGS. 2, 5 and 6, the mounting bracket 154 includes an engage hole 160 through which the fixing bolt 156 passes whereby the mounting bracket 154 is mounted at the main chassis 102 by the fixing bolt 156, and three spiral holes 162a, 162b and 162c which are formed relatively high, to which the adjustment bolts 152a, 152b and 152c are engaged after passing the through holes 158a, 158b and 158c of the head base 150.

An adjustment slot 164 is formed at an end portion extended from one side of the mounting bracket 154 to adjust a distance between the head drum 116 and the audio/control head 118 by inserting an adjustment tool therein.

A first spring sheet 170 is formed at a lower surface of the head base 150, into which a spring 168 is inserted, and a second spring sheet 172 is formed at a position facing the first spring sheet 170 of the main chassis 102. A spring 168 is installed between the first spring sheet 170 and the second spring sheet 172 to elastically support the head base 150.

A hinge protrusion 174 is formed at an upper surface of the main chassis 102 and a hinge hole 176 is formed at a lower surface of the mounting bracket 144, so that the hinge protrusion 174 is inserted into the hinge hole and the mounting bracket 154 is rotated.

Referring to an assembly process of the conventional audio/control head constructed as described above, an audio/control head 118 is fixed at the head base 150 and the three adjustment bolts 152a, 152b and 152c pass the through holes 158a, 158b and 158c of the head base 150 so as to be engaged with the spiral holes 162a, 162b and 162c of the mounting bracket 154. At this time, the spring 168 is installed between the first spring sheet 170 and the second spring sheet 172.

And then, after the hinge protrusion 174 of the main chassis is inserted into the hinge hole 175 of the mounting bracket 154 where the head base 150 is installed, the fixing bolt 156 passes the fixing hole 160 of the mounting bracket and is engaged with the main chassis 102, thereby completing the assembly.

The adjustment of the audio/control head of the conventional art is made as follows.

First, the heights of the erasing head 124 and the audio/control head 118 are rendered to correspond to each other. That is, the height of the audio/control head 118 is adjusted corresponding to the height of the erasing head 124 by ascending the adjustment bolts 152a, 152b and 152c.

At this time, the head base 150 is elastically supported by an elastic force of the spring 168 so as to maintain the height adjusted by the adjustment bolts 152a, 152b and 152c.

Next, a tensile force is suitably maintained in a state that the audio/control head 118 is in contact with the tape 114 by ascending the adjustment bolts 152a, 152b and 152c, and then, a tilt adjustment is performed to adjust a tilt of the audio/control head 118 to heighten a sound output.

Thereafter, an azimuth adjustment is performed such that the adjustment bolts 152a, 152b and 152c are ascended to correspond a recording angle of an audio signal and an angle of the gap portion of the audio/control head 118, thereby adjusting a tilt at the side of the traveling direction of the tape 114 so as to make the maximum sound output.

Finally, an X-distance adjustment is performed to maintain a compatibility by adjusting a distance between an image signal and an audio/control signal on the tape which are simultaneously recorded by adjusting a distance difference between the head drum 116 and the audio/control head 118.

That is, after unbolting the fixing bolts 152a, 152b and 152c, an adjustment tool is inserted into the adjustment slot 164 of the mounting bracket 154 and the mounting bracket 154 is rotated centering around the hinge protrusion 174 formed at the main chassis 102, thereby adjusting the X-distance. After the adjustment is completed, the fixing bolts 152a, 152b and 152c are engaged to fix the adjusted position.

However, in the engagement structure of the audio/control head of the conventional magnetic recording and reproducing device, the audio/control head is fixed at the head base, the head base is adjustably engaged at the mounting bracket, and the mounting bracket is fixed at the main chassis to adjust the position of the audio/control head. Therefore, many parts are required for the engagement of the audio/control head and the position adjustment, resulting in an increase in a fabrication cost. Also, since the number of parts is increased, an assembly time is lengthened, and the assembly work is complicated.

SUMMARY OF THE INVENTION

Therefore, an object of the present invention is to provide an audio/control head assembly of a magnetic recording and reproducing device that is capable of simplifying an engagement structure that an audio/control head is position-adjustably mounted at a main chassis, reducing the number of parts for the engagement of the audio/control head and the position adjustment; simplifying an assembly work, and considerably shortening an assembly time.

To achieve these and other advantages and in accordance with the purpose of the present invention, as embodied and broadly described herein, there is provided an audio/control head assembly of a magnetic recording and reproducing device including: a head base on which an audio/control head is mounted; a plurality of engaging parts formed at a main chassis, with which a plurality of adjustment bolts are engaged after passing the head base so that the head base can be engaged to be adjustable in its position; and a spring installed between the head base and the main chassis to elastically support the head base.

In the audio/control head assembly of a magnetic recording and reproducing device of the present invention, the head base includes a plurality of through holes formed at each corner portion, into which the adjustment bolts are inserted, one of the through hole being formed in a circular shape and the others being formed as slots with a certain length.

In the audio/control head assembly of a magnetic recording and reproducing device of the present invention, the engaging part is formed protruded with a certain height from an upper surface of the main chassis so that the adjustment bolts can be engaged therewith after passing the plurality of through holes of the head base.

In the audio/control head assembly of a magnetic recording and reproducing device of the present invention, the engaging part is formed such that one portion of the main chassis is cut and bent to be protruded upwardly, and a spiral hole is formed at the bent upper surface into which the adjustment bolt is engaged.

In the audio/control head assembly of a magnetic recording and reproducing device of the present invention, one of the engaging parts is formed such that a connection neck portion connected to the main chassis is relatively narrow and thin so as to be transformable to a degree, and an adjustment slot is formed at one side thereof, into which an adjustment tool can be inserted to apply a force for rotating the head base.

In the audio/control head assembly of a magnetic recording and reproducing device of the present invention, one side of the spring is inserted into and supported by the first spring sheet protruded from a lower surface of the head face and the other side of the spring is inserted into and supported by a second spring sheet protruded to an upper surface of the main chassis.

In the audio/control head assembly of a magnetic recording and reproducing device of the present invention, the spring of the audio/control head assembly is a compression coil spring.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may exist a plurality of embodiments of an audio/control head of a magnet recording and reproducing device, of which a preferred embodiment will now be described.

Figure 1:
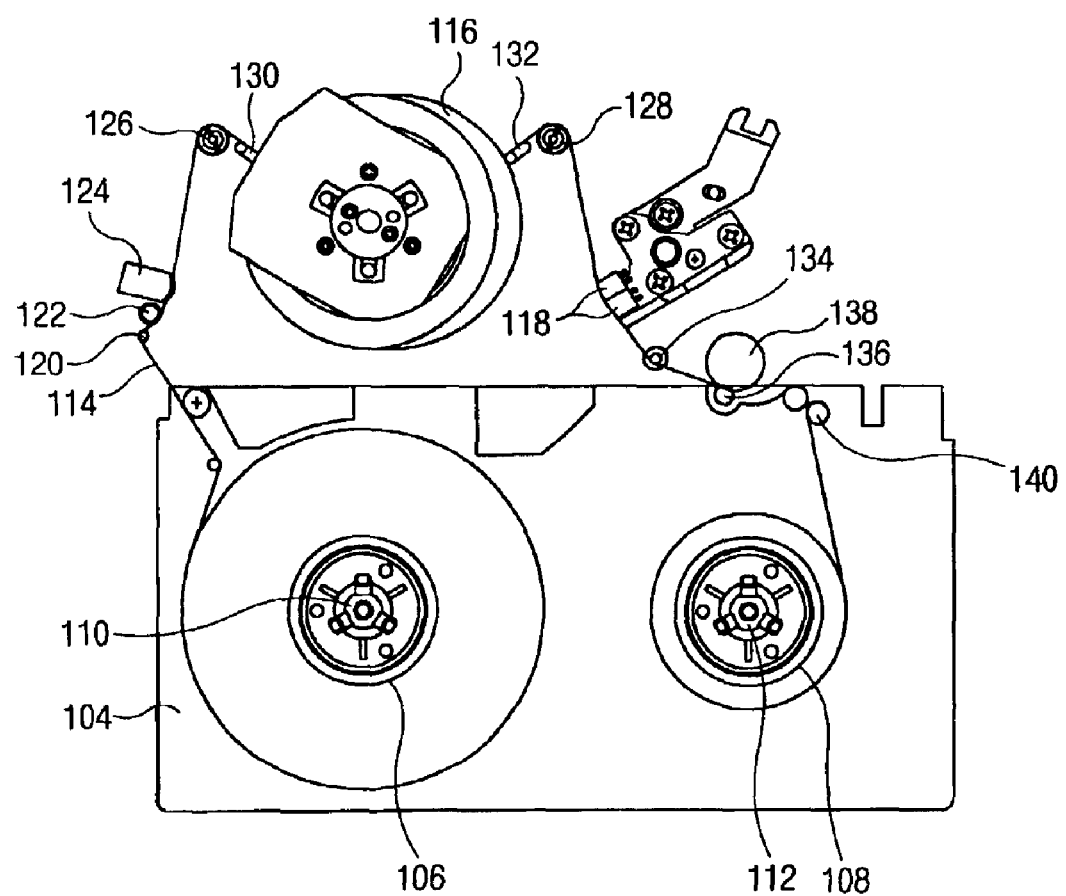
FIG. 1 is a view showing the construction of a magnetic recording and reproducing device in accordance with a conventional art.
Figure 2:
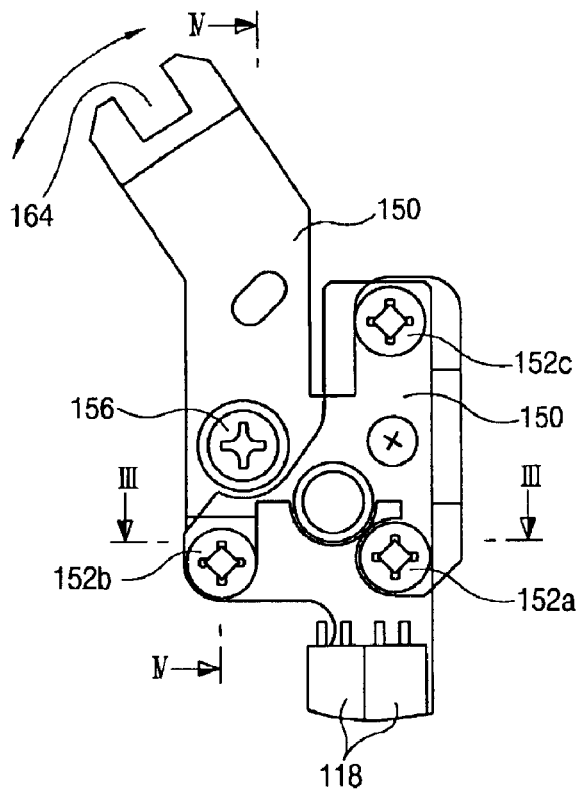
FIG. 2 is a front view of an audio/control head assembly in accordance with the conventional art.
Figure 3:
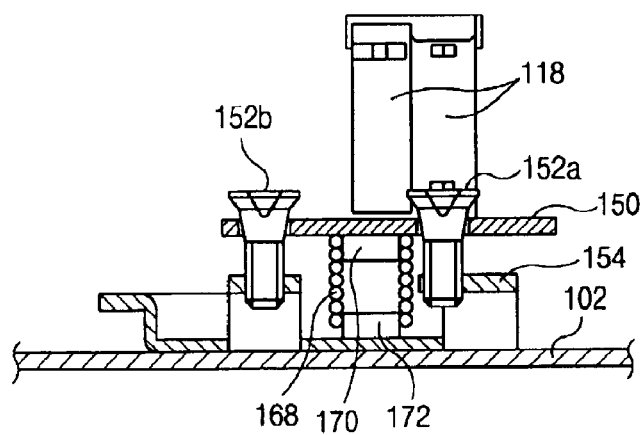
FIG. 3 is a sectional view taken along line III—III of FIG. 2.
Figure 4:
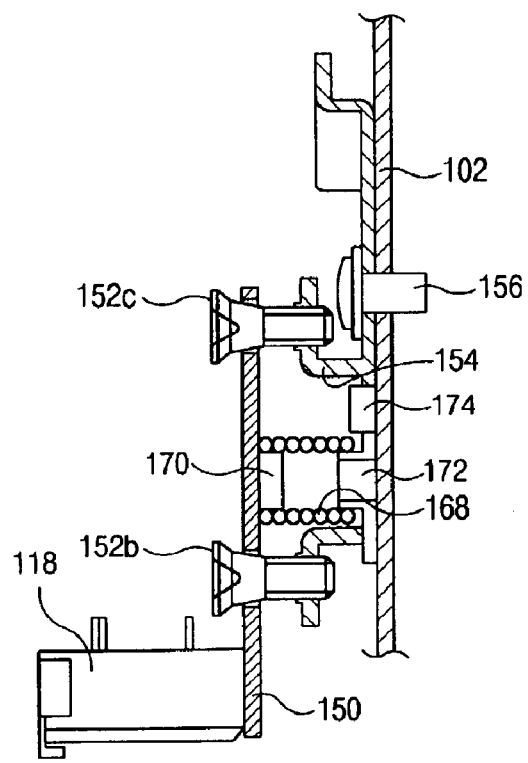
FIG. 4 is a sectional view taken along line IV—IV of FIG. 2.
Figure 5:
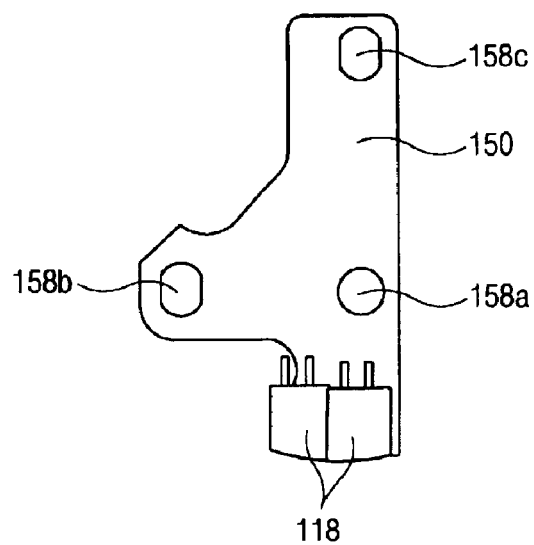
FIG. 5 is a front view of a head base of the audio/control head in accordance with the conventional art.
Figure 6:
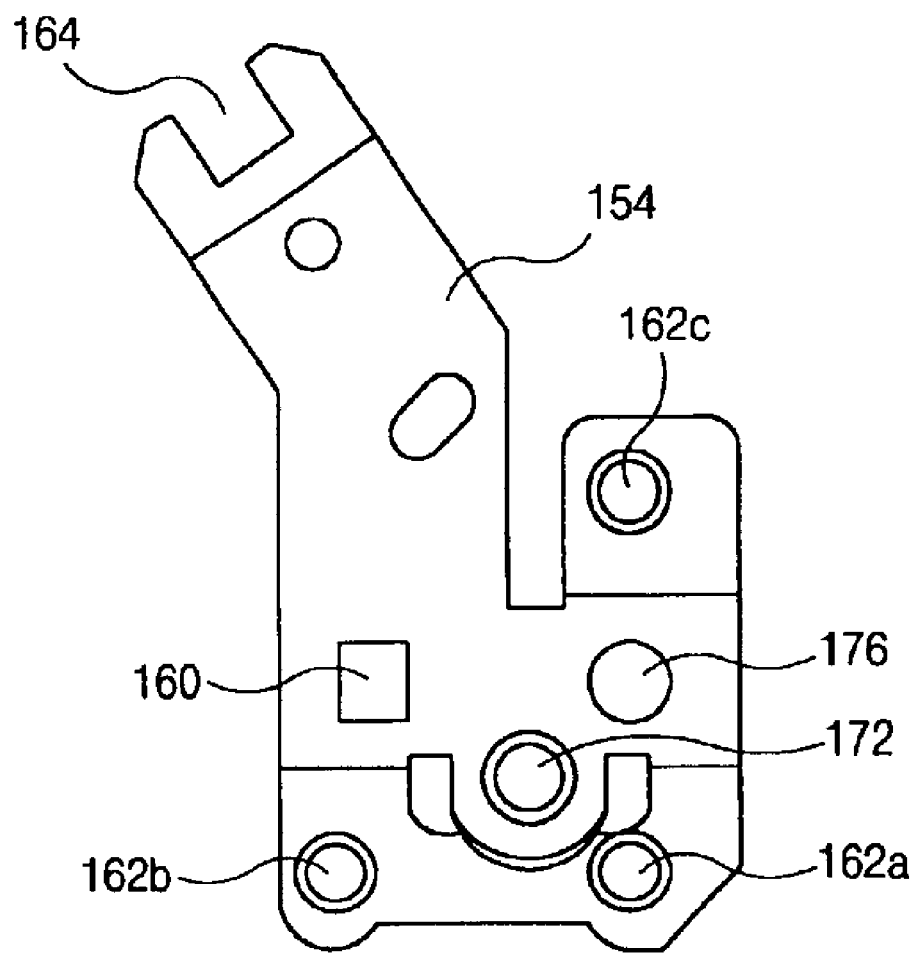
FIG. 6 is a front view of a mounting bracket of the audio/control head in accordance with the conventional art.
Figure 7:
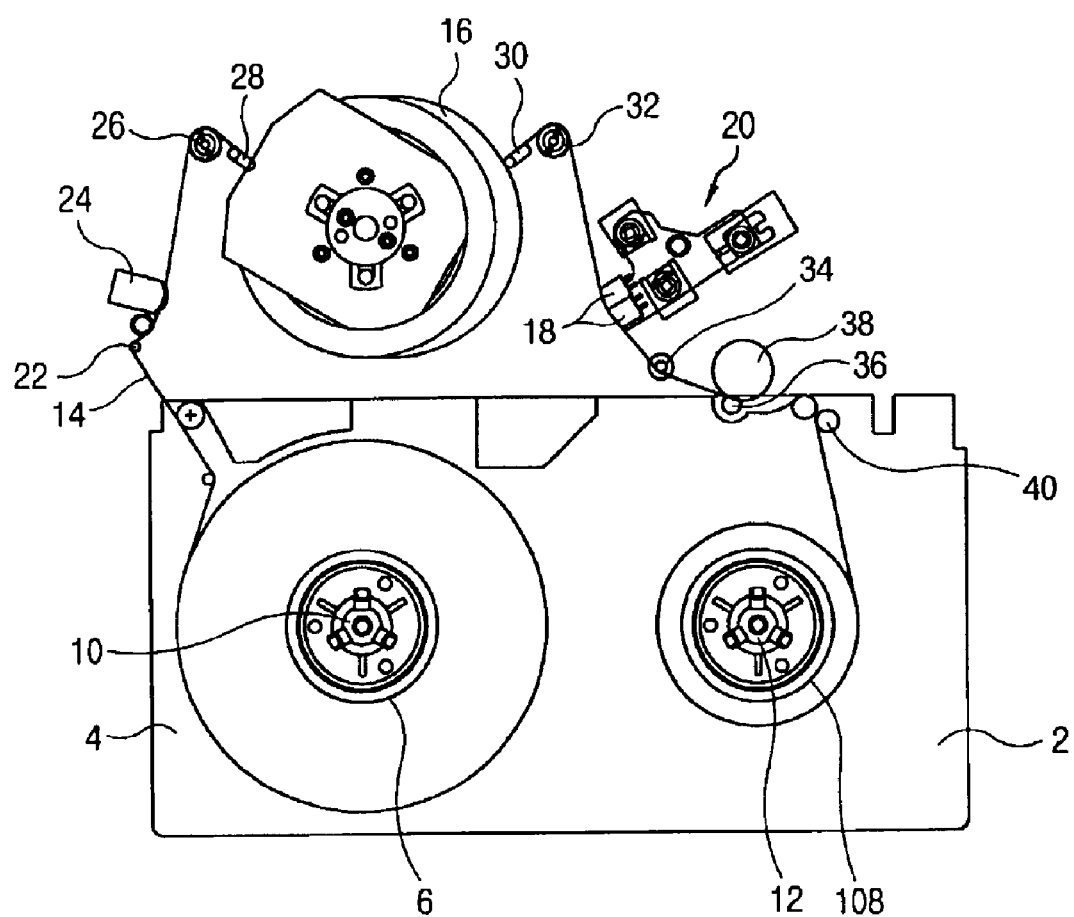
FIG. 7 is a view showing the construction of a magnetic recording and reproducing device in accordance with the present invention.

FIG. 7 is a view showing the construction of a magnetic recording and reproducing device in accordance with the present invention.

A magnetic recording and reproducing device of the present invention includes: a main chassis 2; a reel driving mechanism 10 and 12 installed in the main chassis 2 and driving a feeding reel 6 and a winding reel 8 of a tape cassette 4; a head drum 16 for reproducing a signal recorded at the tape 14 or recording a signal on the tape 14; an audio/control head 18 for deleting, recording and reproducing an audio signal, and recording and reproducing a control signal; an audio/control head assembly 20 for mounting the audio/control head 18 at the main chassis 2 in such a manner that the audio/control head 18 is distance-adjustable; and a plurality of posts and a guide roller for guiding a traveling of the tape 14 released from the tape cassette 4.

The construction and operation of the magnetic recording and reproducing device will now be described along a traveling path of a tape coming out from a tape cassette.

First, the tape 14 coming out of the feeding reel 6 of the tape cassette 4 is controlled in its tensile force while passing a tension post 22. After passing the tension post 22, the tape is guided to an erasing head 24 by a guide post 22. At this time, the erasing head 24 removes a signal recorded on the tape 14 in a recording mode.

After passing the erasing head 24, the tape 14 is guided to the head drum 16 by a feeding guide post 26 and a feeding slant post 28. At this time, the head drum 16 reproduces a signal recorded on the tape 14 or records a signal thereon.

After passing a winding slant post 30 and a guide post 32 via the head drum 16, the tape 14 is guided to the audio/control head 18. The audio/control head 18. The audio/control head 18 is position-adjustably mounted at the main chassis 2 by the audio/control head assembly 20 and performs deletion, recording and reproducing of an audio signal and performs recording and reproducing of a control signal.

After passing the audio/control head 18, the tape 14 passes a guide post 34, during which its height is controlled, and while the tape 14 passes between the capstan shaft 36 and a pinch roller 38, it receives a traveling force, and then the tape 14 is guided by a guide post 40 and wound on the winding reel 8.

The structure of the audio/control head assembly that the audio/control head is engaged at the main chassis in the magnetic recording and reproducing device constructed as described above will now be explained.

Figure 8:
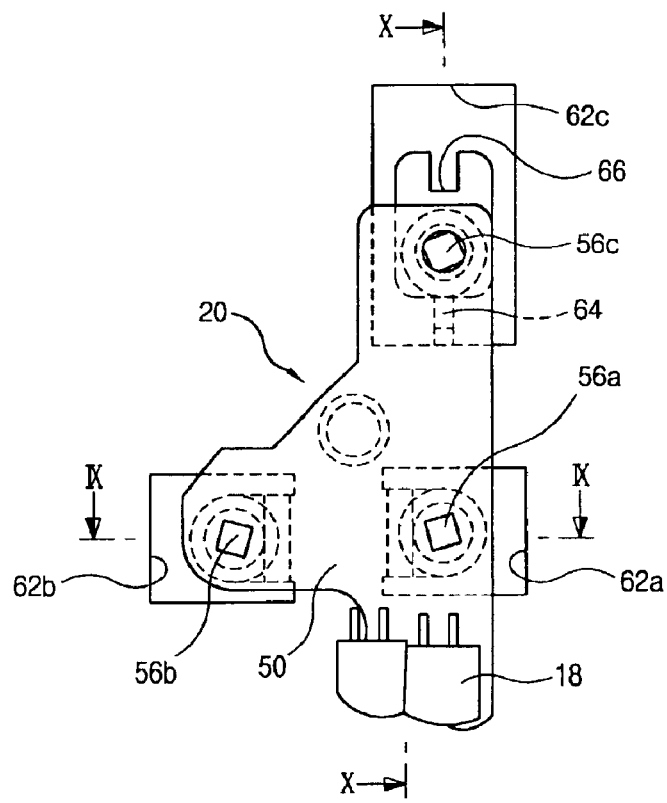
FIG. 8 is a front view of a head assembly of an audio/control head in accordance with the present invention.
Figure 9:
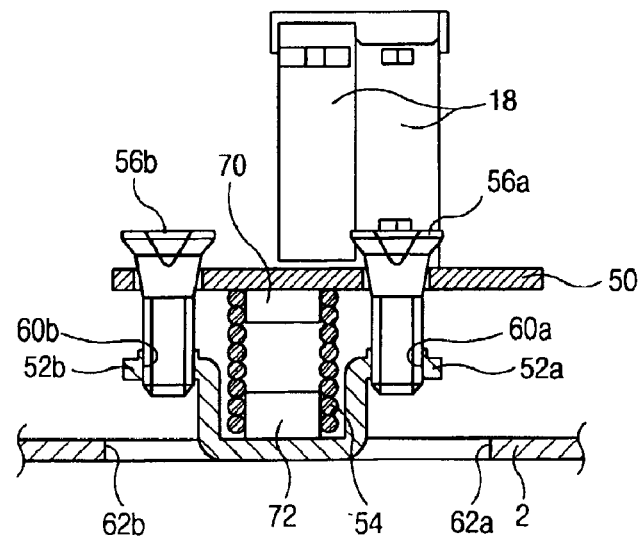
FIG. 9 is a sectional view taken along line IX—IX of FIG. 8.
Figure 10:
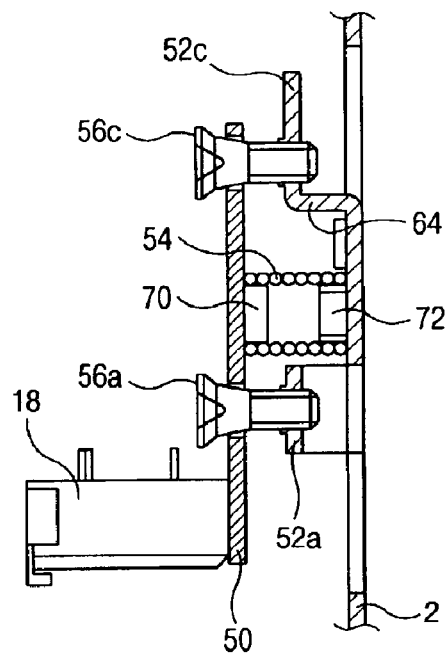
FIG. 10 is a sectional view taken along line X—X of FIG. 8.

FIG. 8 is a front view of a head assembly of an audio/control head in accordance with the present invention, FIG. 9 is a sectional view taken along line IX—IX of FIG. 8, and FIG. 10 is a sectional view taken along line X—X of FIG. 8.

The audio/control head assembly includes a head base 50 on which the audio/control head 18 is mounted; an engaging part 52 formed at the main chassis 2 so as to position-adjustably engage the head base 50 at the main chassis 2; and a spring 54 installed between the head base 50 and the main chassis 2 to elastically support the head base 50.

Figure 11:
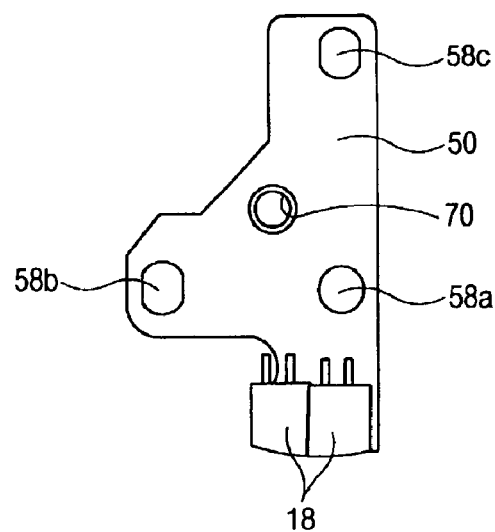
FIG. 11 is a front view of a head base of the audio/control head in accordance with the present invention.

As shown in FIG. 11, the head base 50 is formed as a flat plate making a triangle. At one corner portion of the head base 50, the audio/control head 18 is fixed, and first, second and third through holes 58a, 58b and 58c are formed at each of the three corner portions, into which the adjustment bolts 56a, 56n and 56c are inserted.

The first through hole 58a is formed in a circular shape, and second and third through holes 58b and 58c are formed in a slot shape with a certain length. The first through hole 58a, the third through hole 58c and the audio/control head are preferably formed in a straight line.

The engaging part 52 is formed protruded with a certain height from an upper surface of the main chassis 2 so that the three adjustment bolts 56a, 56b and 56c can be engaged therewith after passing the three through holes 58a, 58b and 58c of the head base 50.

Figure 12:
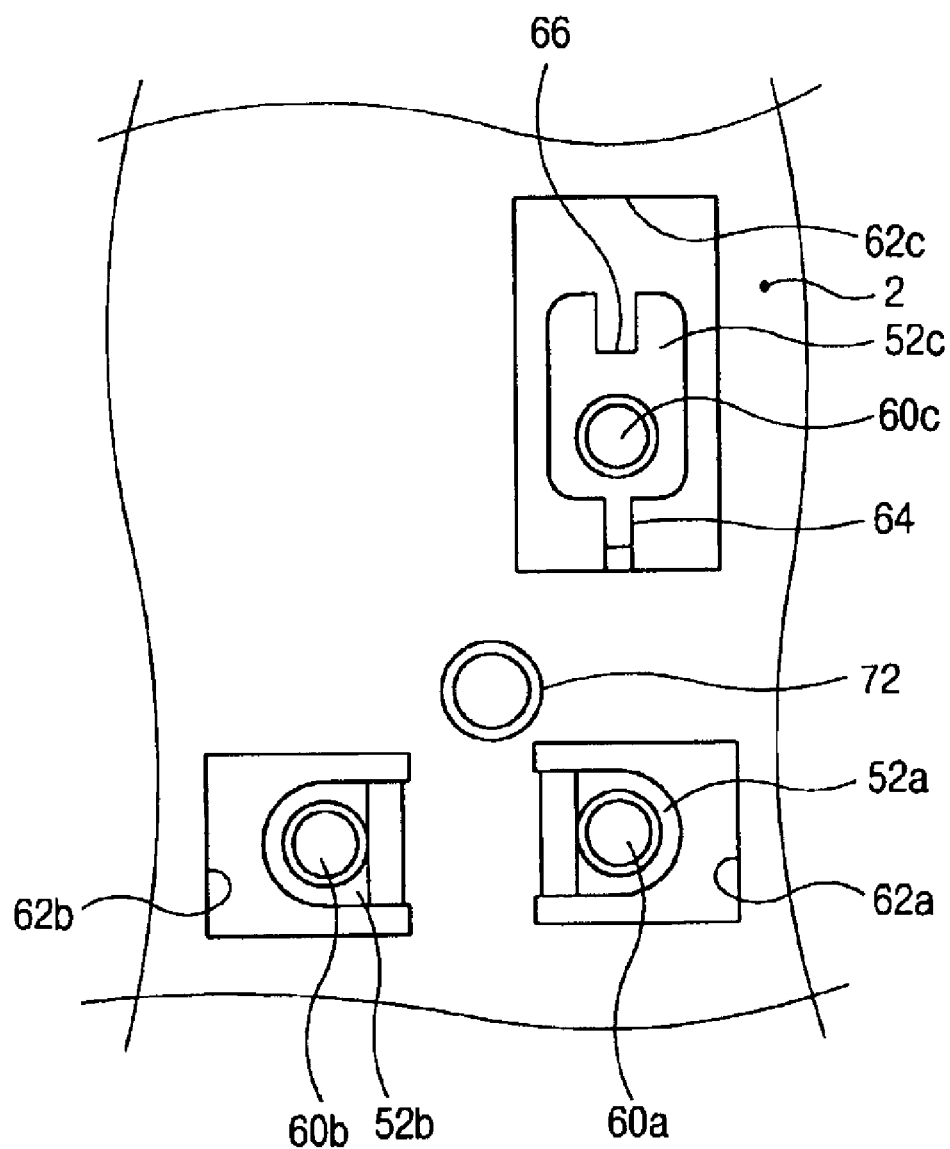
FIG. 12 is a front view of a mounting bracket of an audio/control head in accordance with the present invention.

That is, as shown in FIG. 12, the engaging part includes first, second and third engaging members 52a, 52b and 53b formed corresponding to positions facing the through holes 58a, 58b and 58c of the head base 50 of the main chassis 2, and each of the engaging members 52a, 52b and 52c is formed as cut portions 62a, 62b and 62c cut from one side of the main chassis 2 are bent to be upwardly protruded. Spiral holes 60a, 60b and 60c are formed at the bent upper surface, into which the adjustment bolts 56a, 56b and 56c.

The third engaging member 52c includes a connection neck portion 64 which is connected to the main chassis 2 and is relatively narrow and thin so as to be transformable to a degree. An adjustment slot 66 is formed at one side of the third engaging member 52c, into which the adjustment tool is inserted to transform the third engaging member 52c.

After the height of the head base 50 is adjusted by fastening or loosening the adjustment bolts 56a, 56b and 56c, the spring 54 elastically supports the position of the head base 50 as adjusted. One end portion of the spring 54 is insertedly supported by a first spring sheet 70 protruded from a lower surface of the head base 50, and the other end portion is insertedly supported by a second spring sheet 72 protruded from an upper surface of the main chassis 2.

The assembly process of the audio/control head assembly of the present invention will now be described.

First, the audio/control head 18 is fixed on the head base 50. The head base 50 with the audio/control head 18 mounted thereon is positioned at an upper surface of the main chassis 2, and the spring 54 is positioned between the [the] second spring sheet 72 of the main chassis 2 and the first spring sheet 70 of the head base 50.

At this time, first, second and third through holes 58a, 58b and 58c of the head base 50, and engaging holes 60a, 60b and 60c of the first, second third engaging members 52a, 52b and 52c protruded from the upper surface of the main chassis 2 are aligned to be positioned in a straight line.

Thereafter, the fixing bolts 56a, 56b and 56c pass the through holes 58a, 58b and 58c of the head base 50 and are engaged with the engaging holes 60a, 60b and 60c of each engaging member formed at the main chassis 2, thereby completing the assembly.

The adjustment process of the audio/control head assembly constructed and assembled as described above will now be explained.

First, in order to render the height of the erasing head 24 and the height of the audio/control head 18 to correspond to each other, the adjustment bolts 56a, 56b and 56c are fastened or loosened to adjust the audio/control head 18 corresponding to the height of the erasing head 24.

At this time, the position of the head base 50 as adjusted is elastically supported by the elastic force of the spring 54.

In order to adjust a tilt, in a state that the tape 14 is in contact with the audio/control head 18, the third adjustment bolt 56c is loosened or fastened to change a vertical angle of the audio/control head, for adjustment. At this time, the first and second adjustment bolts 56a and 56b are in a state of being loosened to a degree, and then after the adjustment is finished, the first and second adjustment bolts are suitably fastened.

In case of adjusting the azimuth, the second adjustment bolt 56b is loosened or fastened to change a horizontal angle of the audio/control head 18, for adjustment. Also, at this time, the first and third adjustment bolts 56a and 56c are in a state of being loosened to a degree, and after the adjustment is finished, they are fastened suitably.

Meanwhile, in case of adjusting an X-distance, the adjustment tool is inserted into the adjustment slot 66 formed at the third engaging member 52 and a force is applied in one direction. Then, the connection neck portion 64 of the third engaging member 52c is transformed and the head base 50 is rotated centering around the first through hole 58a into which the first adjustment bolt 56b passes, whereby the adjustment is made.

Figure 13:
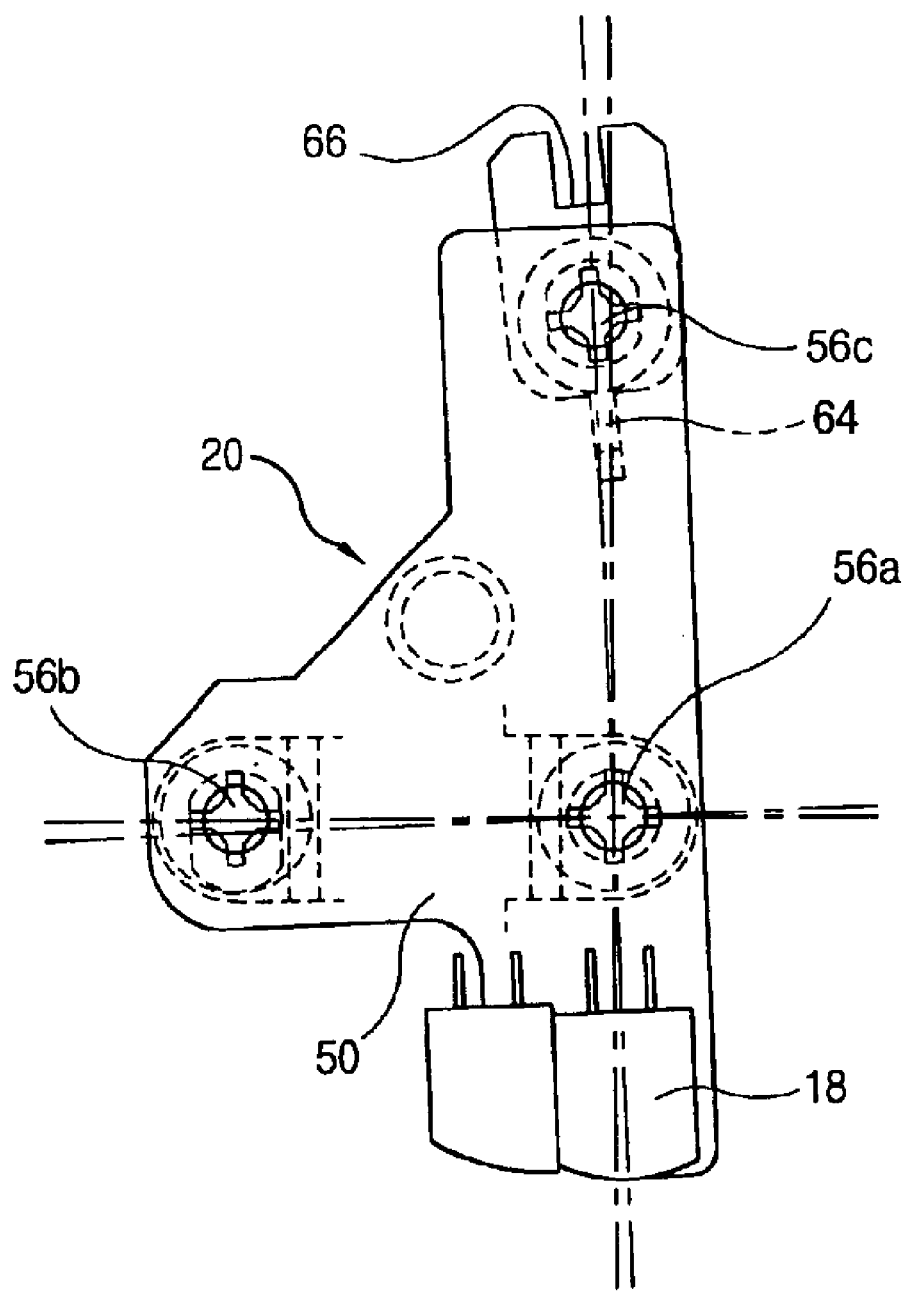
FIG. 13 is a view showing an operation of a head assembly of an audio/control head in accordance with the present invention.

At this time, the second through hole 58b and the third through hole 58c of the head base 50 are formed in a slot shape and the second and third adjustment bolts 56b and 56c are moved along the slot face of the second through hole 58b and the third through hole 58c, the head base 50 can be rotated in FIG. 13.

As so far described, the magnetic recording and reproducing device of the present invention has many advantages.

That is, for example, in the audio/control head assembly, since the head base with the audio/control head mounted thereon is position-adjustably engaged at the main chassis directly, a unit for adjusting the position of the audio/control head is not necessary. Thus, the number of parts can be reduced, and accordingly, the fabrication cost can be reduced.

In addition, since the number of the assembly parts is reduced, an assembly process can be reduced, an assembly workability can be improved, and an assembly time can be shortened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. An audio/control head assembly of a magnetic recording and reproducing device comprising:
   a head base on which an audio/control head is mounted;
   a plurality of engaging parts formed at a main chassis, with which a plurality of adjustment bolts are engaged after passing the head base so that the head base can be engaged to be adjustable in its position; and
   a spring installed between the head base and the main chassis to elastically support the head base
   wherein the head base includes a plurality of through holes formed at at least two corner portions, into which the adjustment bolts are inserted, one of the through holes being formed in a circular shape and the other(s) being formed as slot(s) with a certain length.

2. The assembly of claim 1, wherein the engaging part are formed protruded with a certain height from an upper surface of the main chassis so that the adjustment bolts can be engaged therewith after passing the plurality of through holes of the head base.

3. The assembly of claim 2, wherein the engaging part is formed such that one portion of the main chassis is cut and bent to be protruded upwardly, and a spiral hole is formed at the bent upper surface into which the adjustment bolt is engaged.

4. The assembly of claim 3, wherein one of the engaging parts formed such that a connection neck portion connected to the main chassis is relatively narrow and thin so as to be transformable to a degree, and an adjustment slot is formed at one side thereof, into which an adjustment tool can be inserted to apply a force for rotating the head base.

5. An audio/control head assembly of magnetic recording and reproducing device comprising:
   a head base on which an audio/control head is mounted;
   a plurality of engaging parts formed at a main chassis, with which a plurality of adjustment bolts are engaged after passing the head base so that the head base can be engaged to be adjustable in its position; and
   a spring installed between the head base and the main chassis to elastically support the head base;
   wherein one side of the spring is inserted into and supported by a first spring sheet protruded from a lower surface of the head base and the other side of the spring is inserted into and supported by a second spring sheet protruded to an upper surface of the main chassis.

6. The assembly of claim 5, wherein the spring of the audio/control head assembly is a compression coil spring.

7. An audio/control head assembly of a magnetic recording and reproducing device comprising:
   a head base on which an audio/control head is mounted;
   a plurality of engaging parts formed at a main chassis, with which a plurality of adjustment members are engaged after passing the head base so that the head base can be engaged to be adjustable in its position; and
   a spring installed between the head base and the main chassis to elastically support the head base;
   wherein the engaging parts are formed such that one portion of the main chassis is cut and bent to be protruded upwardly, and a spiral hole is formed at the bent upper surface into which the adjustment member is engaged.

8. The assembly of claim 7, wherein one of the engaging parts is formed such that a connection neck portion connected to the main chassis is relatively narrow and thin so as to be transformable to a degree, and an adjustment slot is formed at one side thereof, into which an adjustment tool can be inserted to apply a force rotating the head base.

9. The assembly of claim 7, wherein the head base includes a plurality of through holes formed at at least two corner portions, into which the adjustment members are inserted, one of the through holes being formed in a circular shape and the others(s) being formed as slot(s) with a certain length.

* * * * *